(12) United States Patent
Park et al.

(10) Patent No.: US 6,261,692 B1
(45) Date of Patent: Jul. 17, 2001

(54) CARBON-CARBON COMPOSITES CONTAINING CERAMIC POWER AND METHOD FOR PREPARING THE SAME

(75) Inventors: Soo-Jin Park; Jae-Rock Lee, both of Daejeon; Min-Seok Cho, Jeonju-shi, all of (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/223,495

(22) Filed: Dec. 31, 1998

(30) Foreign Application Priority Data

Jul. 21, 1998 (KR) .................................................. 98-29194

(51) Int. Cl.⁷ ....................................................... B32B 9/00
(52) U.S. Cl. .................. 428/408; 428/299.1; 428/297.1; 428/325; 428/446; 428/698; 554/401; 554/496; 554/540; 554/145
(58) Field of Search ................................... 428/408, 698, 428/446, 325, 299.1, 297.1; 524/401, 496, 540, 145

(56) References Cited

U.S. PATENT DOCUMENTS

| | | | | |
|---|---|---|---|---|
| 3,787,229 | * | 1/1974 | Rudness | 117/132 |
| 4,377,652 | * | 3/1983 | Ohmura et al. | 524/104 |
| 4,975,261 | * | 12/1990 | Takabatake | 423/445 |
| 5,216,098 | * | 6/1993 | Ahmed et al. | 526/288 |
| 5,380,556 | * | 1/1995 | Hocquellet | 427/228 |
| 5,739,217 | * | 4/1998 | Hagiwara et al. | 525/476 |

* cited by examiner

*Primary Examiner*—Deborah Jones
*Assistant Examiner*—Lymarie Miranda
(74) *Attorney, Agent, or Firm*—Pennie & Edmonds LLP

(57) ABSTRACT

The present invention relates to a method for preparing a carbon-carbon composite. The method of the present invention comprises adding a ceramic-based oxidation inhibitor having a brittle-to-ductile transition, to thereby eliminate high densification processes via re-impregnation and re-carbonization. The present invention also relates to a carbon-carbon composite prepared thereby that comprises a ceramic powder added to a thermosetting resin.

10 Claims, 8 Drawing Sheets

CARBON-CARBON COMPOSITES CONTAINING CERAMIC POWER AND METHOD FOR PREPARING THE SAME

BACKGROUND OF THE INVENTION

1. Field of the Invention

The present invention relates to a method for preparing a carbon-carbon composite and a carbon-carbon composite prepared therefrom. More specifically, the present invention relates to a method for preparing a carbon-carbon composite which comprises the step of adding a ceramic-based oxidation inhibitor having a brittle-to-ductile transition (hereinafter referred to as "BDT"), to thereby eliminate high densification processes via re-impregnation and re-carbonization. Further, the present invention relates to a carbon-carbon composite comprising a ceramic powder added to a thermosetting matrix resin.

2. Description of the Prior Art

'Carbon-carbon composites' in the present invention refer to carbon fiber-reinforced composites, which are prepared by impregnating a carbon fiber as a reinforced material with a matrix resin having good heat stability and carbon yield. Such carbon-carbon composites are superior to metals in their specific strength and specific modulus. They also have good fatigue resistance, heat shock resistance, corrosion resistance, wear resistance, lightness, heat-electrical conductivity and dimensional stability. Moreover, they are the only ultrahigh temperature materials, that do not loss their physical properties at temperatures up to 2000° C. and maintain their mechanical properties up to 3400° C. under a reduced condition. They have been predominantly used as parts of aerospace aircraft (for example, nozzle of rockets, exhaust cones, reentry tips), brake linings for ultrasonic airplanes, high-speed trains and racing cars, body of high-temperature reactors, limiting materials and next generation materials.

U.S. Pat. No. 5,225,283 discloses a process of blending a silicon carbide and a cyclosiloxane monomer and then coating the resultant blend onto a carbon-carbon composite. The silicon carbide used therein acts only as a filler, and brings neither the simplification of manufacturing process nor good properties at high temperatures by employing a brittle-to-ductile transition at high temperature.

U.S. Pat. No. 5,380,556 discloses a process for manufacturing a carbon-carbon composite by treating the surface of matrix with silicon carbide.

U.S. Pat. No. 5,382,392 discloses a method of forming a carbon composite material by simultaneously applying a vertical compressive force and a variable lateral force to a mixture of carbon fiber and a carbon precursor material during carbonization of the mixture.

U.S. Pat. Nos. 5,401,440 and 5,759,622 disclose a method for manufacturing a carbon-carbon composite by using a mixture of phosphoric acid, metal phosphate, polyol and alkoxylated monovalent alcohol as a catalyst.

U.S. Pat. No. 5,556,704 discloses a method for manufacturing a carbon-carbon composite by applying a vertical compressive force and a variable lateral force simultaneously to a mixture of carbon fiber and a carbon precursor material during carbonization of the mixture.

In addition, several other conventional articles also disclose methods for manufacturing a carbon-carbon composite by adding various oxidation inhibitors. However, there is no disclosure of a method for manufacturing a carbon-carbon composite by using a ceramic-based material having a brittle-to-ductile transition behavior in a single process.

FIG. 1 is a flow chart illustrating conventional procedures generally used in the preparation of carbon-carbon composites. Among the several processes depicted in the flow chart, the process for obtaining carbon-carbon composites of high density from the carbonized composites in the preform requires the longest process time. As seen in FIG. 1, the prior art for manufacturing conventional carbon-carbon composites necessitates three to five times of high densification procedures such as re-impregnation processes. If desired, such densification procedures may be repeated more than those times. As seen from the repeated processes shown in FIG. 1, it would take a long time to prepare the final carbon-carbon composites having desired physical properties via many pathways in the laboratory or in the industrial facility.

Conventional carbon-carbon composites thus obtained contain many cracks and pores due to the gas formed by pyrolysis of a matrix during the carbonization procedure. In order to fill such cracked portions and pores, re-impregnation and re-carbonization processes are repeated several times, which renders the manufacturing process complicated and, as a result, increases process costs.

SUMMARY OF THE INVENTION

The present inventors have made extensive studies in order to overcome the above-mentioned problems caused in the preparation of a carbon-carbon composite. The present inventors have found that a carbon-carbon composite having improved mechanical properties can be obtained by a simple manufacturing process which comprises only adding ceramic powder as an oxidation inhibitor into a matrix resin and eliminates re-impregnation and re-carbonization processes. The present invention has been attained on the basis of such finding.

It is therefore an object of the present invention to overcome the above-mentioned problems.

It is another object of the present invention to provide a method for preparing a carbon-carbon composite, which comprises adding a ceramic-based oxidation inhibitor having a brittle-to-ductile transition and eliminates re-impregnation and re-carbonization needed for high densification processes.

It is a further object of the present invention to provide a carbon-carbon composite comprising ceramic powder added to a thermosetting matrix resin.

Accordingly, the present invention provides a carbon-carbon composite consisting of a carbon fiber as a reinforced material, ceramic powder as an oxidation inhibitor and a thermosetting resin.

The oxidation inhibitor used in the present invention can be ceramic powders such as $MoSi_2$, $TiSi_2$, $SiC$, $Si_3N_4$, $SiGe$ or $TiC$ and the thermosetting resin is preferably a phenol resin. The ceramic powder has particle size in the range of 0.01 to 1 $\mu$m. When the size is less than 0.1 $\mu$m, the workability of the process is poor. When the size exceeds 1 $\mu$m, a phase separation phenomenon may arise.

It is preferred that the ceramic powder is added in an amount of 2 to 20% by weight on the basis of the resin. If the amount is less than 2% by weight, the activity as a filler is insufficient. If the amount exceeds 20% by weight, a phase separation phenomenon may arise.

The present invention also provides a method for preparing a carbon-carbon composite comprising the following steps: (a) impregnating a carbon fiber with a thermosetting resin to give prepregs, (b) laminating the obtained prepregs to give a laminate, (c) curing the laminate to give a green body composite, and then (d) carbonizing the green body composite to give a carbon-carbon composite. According to the method of the present invention, ceramic powder is added to the thermosetting resin as an oxidation inhibitor.

The other objects and features of the present invention will become apparent to those skilled in the art from the following detailed description. It should be understood, however, that the detailed description and specific examples, while indicating preferred embodiments of the present invention are given way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Figure 1:
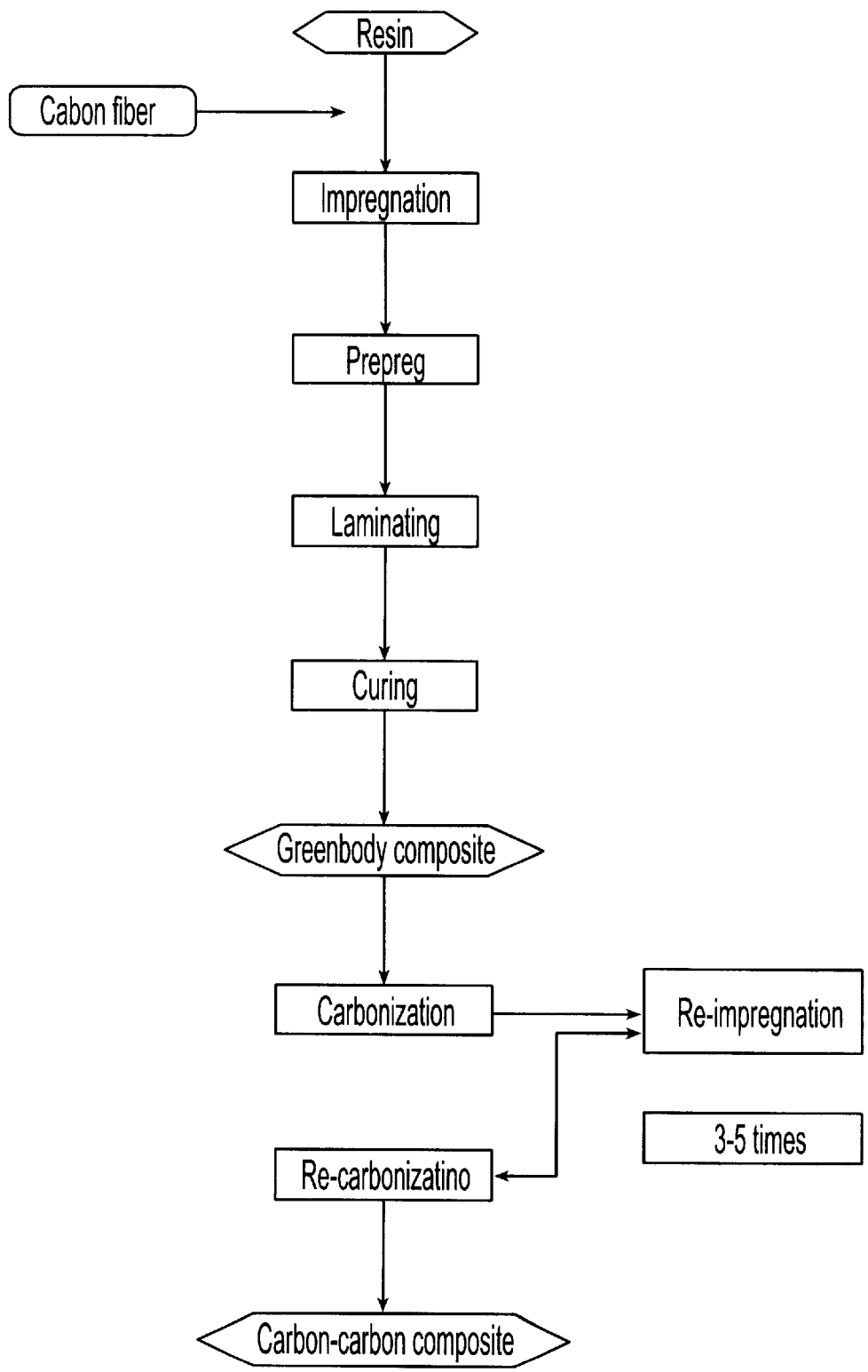
FIG. 1 shows a flow chart of a conventional method for preparing carbon-carbon composites without using a ceramic material.
Figure 2:
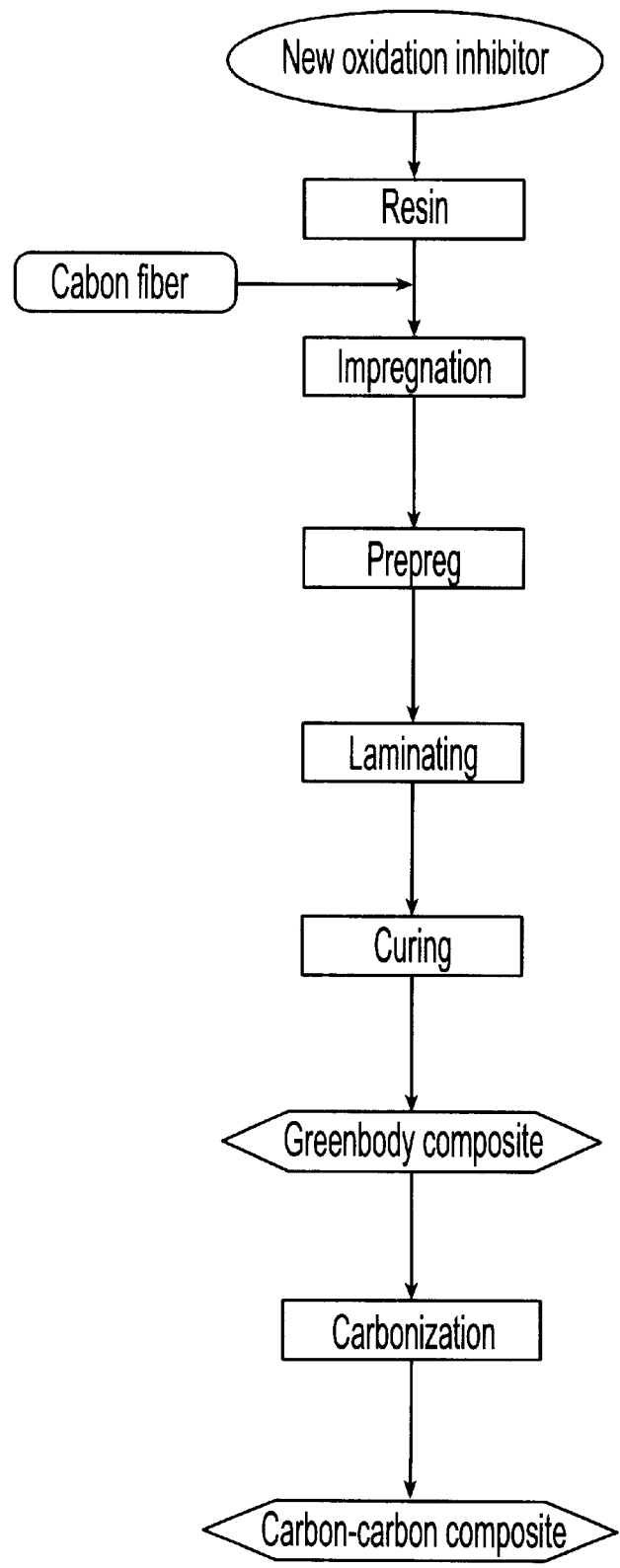
FIG. 2 shows a flow chart of the method for preparing a carbon-carbon composite according to the present invention.
Figure 3:
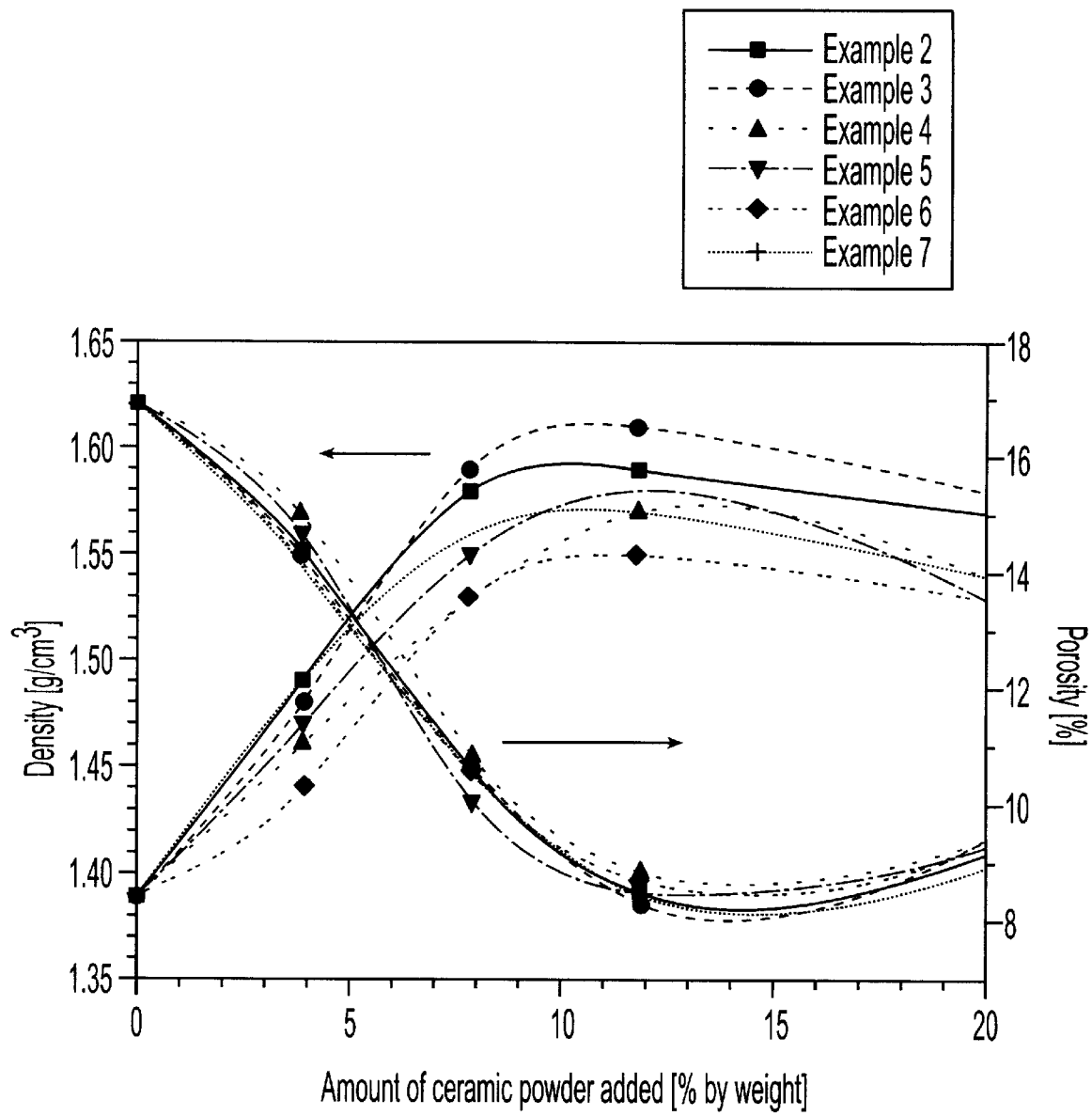
FIG. 3 shows graphs of density and porosity (after carbonization) of the carbon-carbon composite prepared according to the present invention.
Figure 4:
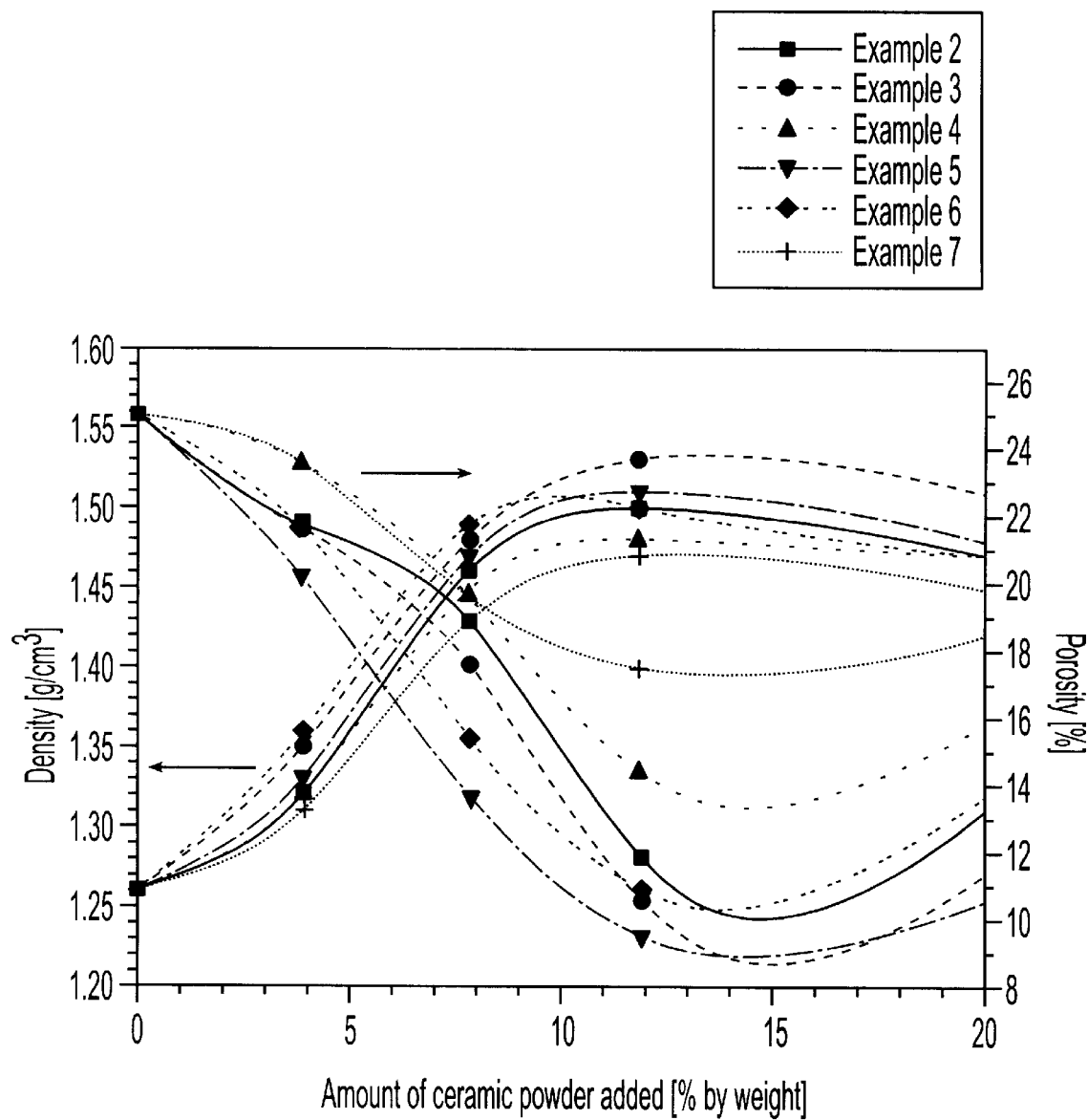
FIG. 4 shows graphs of density and porosity (after graphitization) of the carbon-carbon composite prepared according to the present invention.
Figure 5:
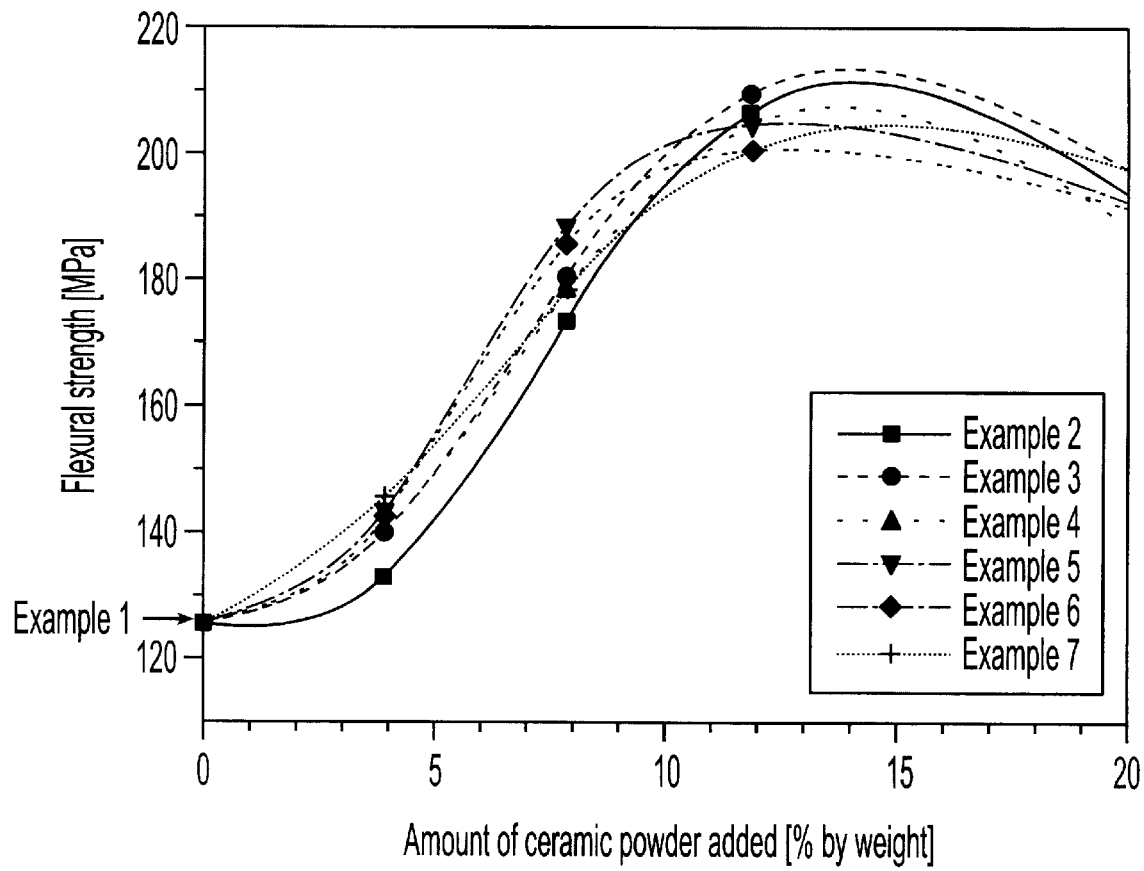
FIG. 5 shows graphs of flexural strength (at room temperature after carbonization) of the carbon-carbon composite prepared according to the present invention.
Figure 6:
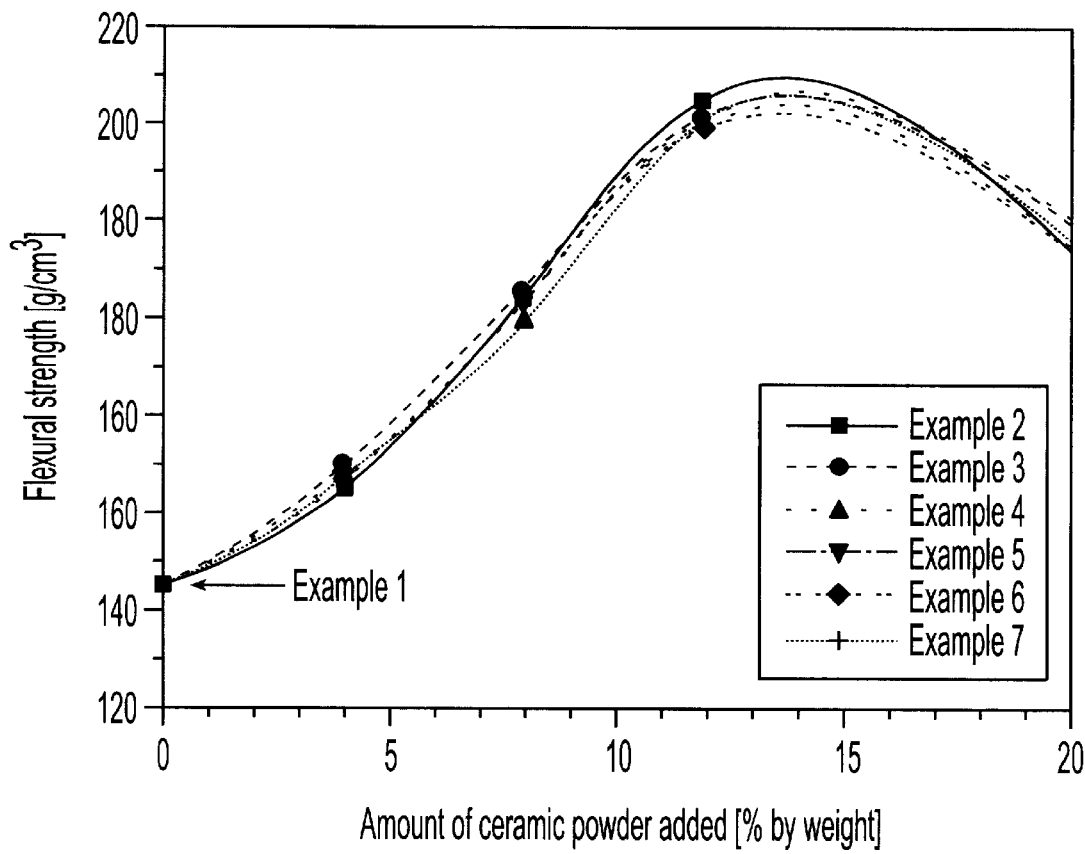
FIG. 6 shows graphs of flexural strength (at high temperature after carbonization) of the carbon-carbon composite prepared according to the present invention.
Figure 7:
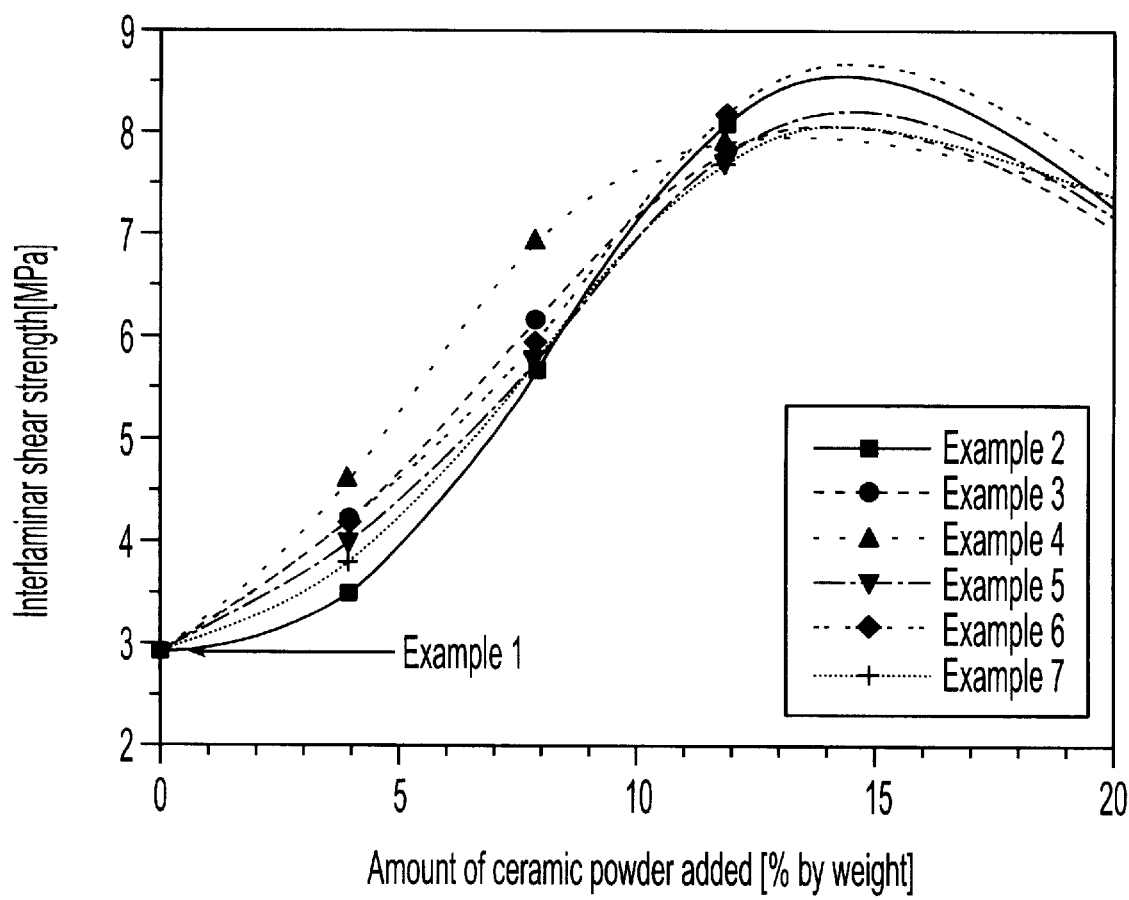
FIG. 7 shows graphs of interlaminar shear strength (at room temperature after carbonization) of the carbon-carbon composite prepared according to the present invention.
Figure 8:
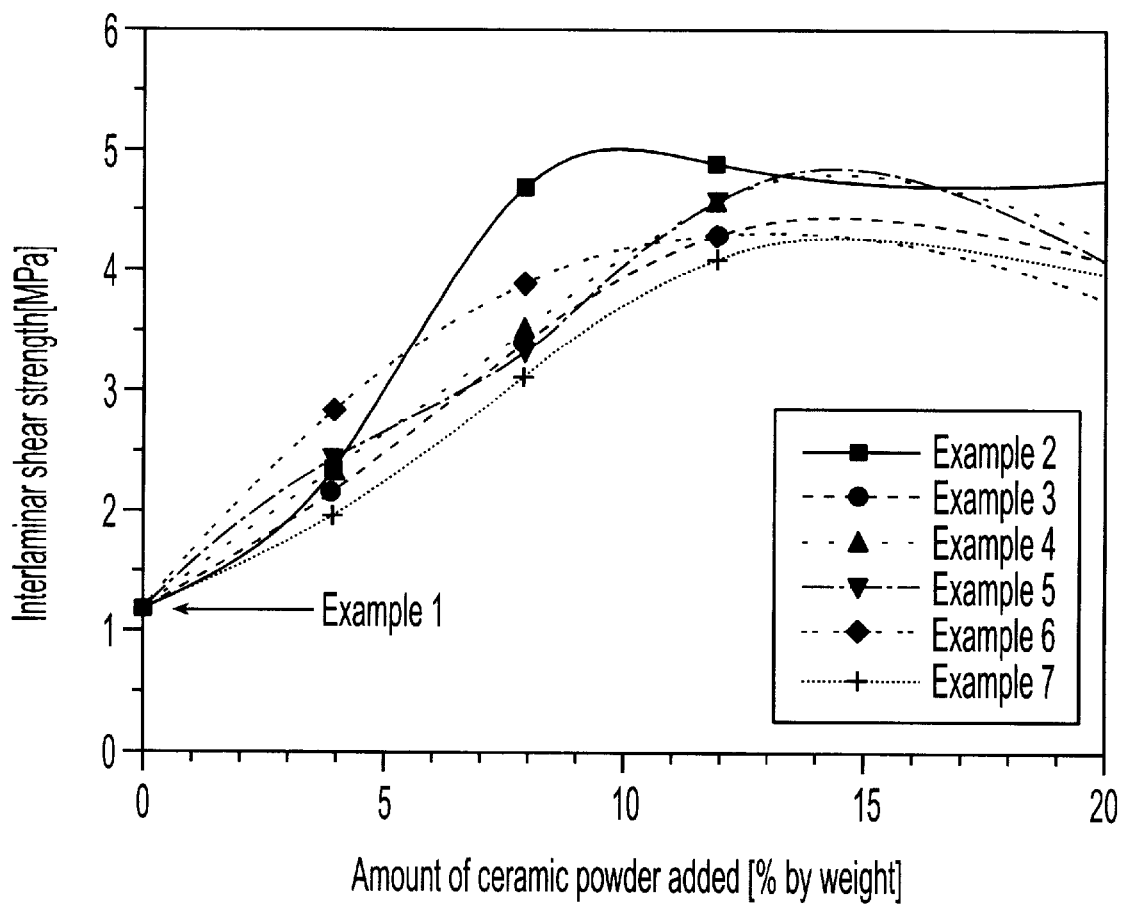
FIG. 8 shows graphs of interlaminar shear strength (at high temperature after carbonization) of the carbon-carbon composite prepared according to the present invention.

FIG. 2 illustrates a process for preparing a carbon-carbon composite according to the present invention. The method of the present invention adds a ceramic-based oxidation inhibitor in a resin, to eliminate high densification procedure of re-impregnation and re-carbonization. Preferably, ceramic powders are used as the oxidation inhibitor that show brittleness up to a certain BDT temperature. When the mixture of ceramic powders and the resin is in the condition of BDT temperature or more, the ceramic powders become ductile to fill pores of cured resin, resulting in high densification. Thus, it is possible to shorten the high densification procedure.

The present invention is described in more detail by the following examples without limiting the scope of the invention in any way.

In the present invention, the following values of physical properties are determined in the following ways:

1. Density (g/cm$^3$) and porosity (%)

The density and porosity were determined by a boiling water method in accordance with ASTM C20-83 to evaluate high densification property of a carbon-carbon composite containing a new oxidation inhibitor.

2. Flexural strength (MPa) and flexural modulus (GPa)

The flexural strength and flexural modulus at room temperature were determined by flexural experiments at three points. The ratio of the distance between the supporting dies to thickness of the sample was fixed at 20:1.

The flexural strength and flexural modulus at high temperature were determined by flexural experiments at three points at 1000° C. Other procedures were carried out in the same manner as a room temperature experiment.

3. Interlaminar shear strength (Mpa)

The interlaminar shear strength at room temperature was determined by a short beat test method. The ratio of the distance between the supporting dies to the thickness of the sample was fixed at 5:1.

The interlaminar shear strength at high temperature was determined by a short beam test method at 1000° C. Other procedures were carried out in the same way as a room temperature experiment.

EXAMPLE 1

Preparation of a Composite Without Using Ceramic-Based Oxidation Inhibitor

To prepare a carbon composite, a polyacrylonitrile (PAN)-based carbon fiber "TZ-307" (manufactured by Taekwang Co. Ltd. in Korea) having high strength was used as a reinforced material and a resol-type phenol resin (manufactured by Kangnam Chemical Co. Ltd. in Korea) was used as a binding agent. The phenol resin was prepared by diluting stock solution with ethylene glycol, so that the workability may be good and the carbon fiber would be easily impregnated in the resin during the preparation of cured article and carbonized material.

The carbon fiber was impregnated with a phenol resin by means of a drumwinding machine to give prepregs. The prepregs were laminated and molded by means of a heat pressure under vacuum. The phenol resin was cured at 120° C. to 130° C. In order to remove volatile ethylene glycol, the resultant material was maintained for one hour at 200° C., and then was subjected to post curing for two hours at 220° C. The pressures at curing were maintained 3.5 MPa at 130° C., 7 MPa at 150° C. and 10.5 MPa at 175° C. The obtained green body composite was warmed at a rate of 10° C. per hour up to 1100° C. per hour by using a heating furnace under inactive atmosphere. Then the resultant material was carbonized for two hours. Again, the obtained material was warmed at a rate of 400° C. per hour up to 2300° C. per hour, and then subjected to graphitization.

The physical properties of the obtained composite after carbonization and graphitization are shown in Tables 1 and 2, respectively.

EXAMPLE 2

MoSi$_2$ (manufactured by Aldrich Chemical Co.), as an oxidation inhibitor, was pulverized by a freezer mill to give a particle of about 0.01 μm. 4% by weight of MoSi$_2$ particle was added to a phenol resin and stirred evenly. The resultant material was cured in the same manner as in Example 1 to give a green body composite. In a similar fashion in Example 1, the green body composite was carbonized and graphitized to give a carbon-carbon composite.

The physical properties of the obtained composite after carbonization and graphitization are shown in Tables 1 and 2, respectively.

EXAMPLE 3

TiSi$_2$, as an oxidation inhibitor, was pulverized in the same manner as in Example 2 to give a particle of about 0.05

μm. 8% by weight of TiSi$_2$ particle was added to a phenol resin and stirred evenly. The resultant material was cured in the same manner as Example 1 to give a green body composite. In a similar way to Example 1, the green body composite was carbonized and graphitized to give a carbon-carbon composite.

The physical properties of the obtained composite after carbonization and graphitization are shown in Tables 1 and 2, respectively.

EXAMPLE 4

SiC, as an oxidation inhibitor, was pulverized in the same manner as in Example 2 to give a particle of about 0.1 μm. 2% by weight of SiC particle was added to a phenol resin and stirred evenly. The resultant material was cured in the same manner as in Example 1 to give a green body composite. In a similar manner as in Example 1, the green body composite was carbonized and graphitized to give a carbon-carbon composite.

The physical properties of the obtained composite after carbonization and graphitization are shown in Tables 1 and 2, respectively.

EXAMPLE 5

Si$_3$N$_4$, as an oxidation inhibitor, was pulverized in the same manner as in Example 2 to give a particle of about 0.5 μm. 12% by weight of Si$_3$N$_4$ particle was added to a phenol resin and stirred evenly. The resultant material was cured in the same manner as in Example 1 to give a green body composite. In a similar fashion to Example 1, the green body composite was carbonized and graphitized to give a carbon-carbon composite.

The physical properties of the obtained after carbonization and graphitization are shown in Tables 1 and 2, respectively.

EXAMPLE 6

SiGe, as an oxidation inhibitor, was pulverized in the same manner as in Example 2 to give a particle of about 0.8 μm. 15% by weight of SiGe particle was added to a phenol resin and stirred evenly. The resultant material was cured in the same manner as in Example 1 to give a green body composite. In a similar fashion to Example 1, the green body composite was carbonized and graphitized to give a carbon-carbon composite.

The physical properties of the obtained composite after carbonization and graphatization are shown in Tables 1 and 2, respectively.

EXAMPLE 7

TiC, as an oxidation inhibitor, was pulverized in the same manner as in Example 2 to give a particle of about 1.0 μm. 20% by weight of TiC particle was added to a phenol resin and stirred evenly. The resultant material was cured in the same manner as in Example 1 to give a green body composite. In a similar fashion to Example 1, the green body composite was carbonized and graphitized to give a carbon-carbon composite.

The physical properties of the obtained composite after carbonization and graphitization are shown in Tables 1 and 2, respectively.

TABLE 1

Physical properties of composites after carbonization

| | Density | Porosity | Flexural strength RT[a] | Flexural strength HT[b] | Flexural modulus RT[a] | Flexural modulus HT[b] | Interlaminar shear strength RT[a] | Interlaminar shear strength HT[b] |
|---|---|---|---|---|---|---|---|---|
| Ex. 1 | 1.39 | 16.97 | 125.4 | 104.6 | 42 | 4.1 | 2.8 | 1.1 |
| Ex. 2 | 1.59 | 8.47 | 207 | 204.9 | 174 | 76.5 | 8.1 | 4.9 |
| Ex. 3 | 1.61 | 8.31 | 210 | 201.5 | 170 | 88.6 | 7.8 | 4.3 |
| Ex. 4 | 1.57 | 8.84 | 201.3 | 199.5 | 171 | 73.9 | 7.9 | 4.6 |
| Ex. 5 | 1.58 | 8.51 | 205 | 199.3 | 169 | 77.5 | 7.8 | 4.6 |
| Ex. 6 | 1.55 | 8.67 | 201 | 198.7 | 163 | 72.3 | 8.2 | 4.3 |
| Ex. 7 | 1.57 | 8.46 | 205 | 200.4 | 168 | 75.5 | 7.7 | 4.1 |

TABLE 2

Physical properties of composites after graphitization

| | Density | Porosity | Flexural strength RT[a] | Flexural strength HT[b] | Flexural modulus RT[a] | Flexural modulus HT[b] | Interlaminar shear strength RT[a] | Interlaminar shear strength HT[b] |
|---|---|---|---|---|---|---|---|---|
| Ex. 1 | 1.26 | 25.01 | 131 | 109.4 | 51 | 8.3 | 3.1 | 2.1 |
| Ex. 2 | 1.50 | 11.8 | 213 | 209.9 | 186 | 101 | 13.6 | 9.5 |
| Ex. 3 | 1.53 | 10.5 | 231 | 211.6 | 192 | 103 | 12.6 | 10.3 |
| Ex. 4 | 1.48 | 14.4 | 220 | 212.5 | 173 | 120 | 8.9 | 7.8 |
| Ex. 5 | 1.51 | 9.43 | 215 | 201 | 179 | 120.3 | 10.3 | 8.6 |
| Ex. 6 | 1.50 | 10.8 | 211 | 199.7 | 169 | 95.7 | 8.8 | 6.5 |
| Ex. 7 | 1.47 | 17.5 | 215 | 207.4 | 166 | 89 | 7.9 | 6.3 |

(Note: Ex.= Example, [a]= Room Temperature, [b]= High Temperature)

As clearly seen from Tables 1 and 2, the addition of ceramic powders as an oxidation inhibitor according to the present invention (Examples 2 to 7) can greatly increase the density of the products, decrease the porosity of the products by almost two times and increase the flexural strength, flexural modulus and interlaminar shear strength by about 2–4 times, compared to the case where no ceramic powder is used (Example 1).

As mentioned above, when ceramic powders are added as an oxidation inhibitor to a resin according to the process of the present invention, repetition of re-impregnation and re-carbonation processes of the green body composite can be eliminated. Thereby, the process for preparing a carbon-carbon composites becomes much simpler. Moreover, the carbon-carbon composites prepared therefrom show excellent physical properties, such as high density, flexural strength, flexural modulus and interlaminar shear strength.

What is claimed is:

1. A carbon-carbon composite consisting of a carbon fiber as a reinforcing material, ceramic powder as an oxidation inhibitor, and a thermosetting resin, wherein the ceramic powder comprises a ceramic powder of MoSi$_2$, TiSi$_2$ or SiGe.

2. A carbon-carbon composite consisting of a carbon fiber as a reinforcing material, ceramic powder as an oxidation inhibitor, and a thermosetting resin, wherein the ceramic powder is distributed in the thermosetting resin, and wherein said oxidation inhibitor is a ceramic powder of MoSi$_2$, TiSi$_2$, Si$_3$N$_4$, or SiGe and said thermosetting resin is phenol resin.

3. The carbon-carbon composite according to claim 1 wherein the particle size of said ceramic powder is 0.01 to 1 μm.

4. The carbon-carbon composite according to claim 1 wherein said ceramic powder comprises $MoSi_2$ particles of about 0.01 μm.

5. The carbon-carbon composite according to claim 1 wherein said ceramic powder comprises $TiSi_2$ particles of about 0.05 μm.

6. The carbon-carbon composite according to claim 1 wherein said ceramic powder comprises SiC particles of about 0.1 μm.

7. The carbon-carbon composite according to claim 1 wherein said ceramic powder comprises $Si_3N_4$ particles of about 0.5 μm.

8. The carbon-carbon composite according to claim 1 wherein said ceramic powder comprises SiGe particles of about 0.8 μm.

9. The carbon-carbon composite according to claim 1 wherein said ceramic powder comprises TiC particles of about 1.0 μm.

10. The carbon-carbon composite according to claim 1 wherein said oxidation inhibitor is in an amount of 2 to 20% by weight on the basis of the resin.

* * * * *